US012525218B2

(12) United States Patent
Candelore et al.

(10) Patent No.: US 12,525,218 B2
(45) Date of Patent: Jan. 13, 2026

(54) NOISE CANCELATION FOR LOUD AMBIENT TRANSIENT SOUNDS

(71) Applicant: Sony Group Corporation, Tokyo (JP)

(72) Inventors: Brant Candelore, Poway, CA (US); Mahyar Nejat, La Jolla, CA (US)

(73) Assignee: SONY GROUP CORPORATION, Tokyo (JP)

( * ) Notice: Subject to any disclaimer, the term of this patent is extended or adjusted under 35 U.S.C. 154(b) by 322 days.

(21) Appl. No.: 18/203,586

(22) Filed: May 30, 2023

(65) Prior Publication Data

US 2024/0404499 A1 Dec. 5, 2024

(51) Int. Cl.
*G10K 11/178* (2006.01)
*H04R 1/10* (2006.01)

(52) U.S. Cl.
CPC .. *G10K 11/17827* (2018.01); *G10K 11/17823* (2018.01); *G10K 11/17873* (2018.01); *H04R 1/1016* (2013.01); *H04R 1/1083* (2013.01); *G10K 2210/1081* (2013.01); *G10K 2210/3027* (2013.01); *G10K 2210/3056* (2013.01); *H04R 2460/01* (2013.01)

(58) Field of Classification Search
CPC ....... G10K 11/17885; G10K 11/17837; G10K 11/17827
See application file for complete search history.

(56) References Cited

U.S. PATENT DOCUMENTS

| | | | |
|---|---|---|---|
| 9,648,410 | B1 | 5/2017 | Kratsas et al. |
| 2016/0300562 | A1 | 10/2016 | Goldstein et al. |
| 2018/0176672 | A1 | 6/2018 | Adkins |
| 2018/0322861 | A1 | 11/2018 | Ibrahim |
| 2020/0296500 | A1 | 9/2020 | Wang |
| 2022/0091674 | A1 | 3/2022 | Kemmerer |
| 2022/0164157 | A1 | 5/2022 | St Amant |
| 2023/0058427 | A1 | 2/2023 | Pakarinen |
| 2023/0156401 | A1 | 5/2023 | Marchant |

FOREIGN PATENT DOCUMENTS

| | | | |
|---|---|---|---|
| CN | 106297763 | B | 10/2018 |
| WO | WO2020131963 | A1 | 6/2020 |
| WO | WO-2022081167 | A1 | 4/2022 |

*Primary Examiner* — Kile O Blair
(74) *Attorney, Agent, or Firm* — Trellis IP Law Group, PC

(57) ABSTRACT

Implementations generally relate to noise cancelation for loud ambient transient sound. In some implementations, a method includes capturing, by a one or more microphones coupled to one or more earbuds, ambient sounds from an environment of the user while the user is wearing the one or more earbuds. The method further includes enabling, by the one or more earbuds, the user to hear the ambient sounds and media content sounds. The method further includes attenuating the ambient sounds based on one or more noise cancellation policies.

15 Claims, 5 Drawing Sheets

500

NOISE CANCELATION FOR LOUD AMBIENT TRANSIENT SOUNDS

BACKGROUND

Users often wear earbuds to listen to media content such as music, a podcast, an audiobook, etc. In many cases, users actually want to hear sounds ambient sound in order to be aware of their surroundings. However, when loud ambient sounds occur from the environment (e.g., traffic, construction, etc.), lyrics or dialogue of the media content may be interfered with and even rendered incomprehensible. The media content may not be understood without increasing the volume of the medio content sounds to overcome the volume of the ambient noise. The increase in volume of either source of sound may damage the ears of a user in the long term. Some headphones have noise cancellation features. Such headphones can typically be adjusted manually, which may be inconvenient to the user due to the user needing to open an application on a smart phone to make adjustments or possibly, in some cases, manually tap the outside of the headphone which may or may not be properly interpreted by the earbud to turn on noise cancellation. When the loud noise goes away, the user would typically need to manually change the setting back to the original setting.

SUMMARY

Implementations generally relate to noise cancelation for loud ambient transient sound. In some implementations, a system includes one or more earbuds configured to be inserted into ears of a user, one or more microphones coupled to the one or more earbuds, and one or more processors coupled to the one or more earbuds. The system also includes logic encoded in one or more non-transitory computer-readable storage media for execution by the one or more processors. When executed, the logic is operable to cause the one or more processors to perform operations including: capturing, by the one or more microphones, ambient sounds from an environment of the user while the user is wearing the one or more earbuds; enabling, by the one or more earbuds, the user to hear the ambient sounds and media content sounds; and attenuating the ambient sounds based on one or more noise cancellation policies.

With further regard to the system, in some implementations, the logic when executed is further operable to cause the one or more processors to perform operations including merging the ambient sounds with the content media sounds. In some implementations, the logic when executed is further operable to cause the one or more processors to perform operations including: monitoring a sound level of the ambient sounds; detecting if the sound level of the ambient sounds increases above a predetermined threshold; and attenuating the ambient sounds if the ambient sound increases above the predetermined threshold. In some implementations, the logic when executed is further operable to cause the one or more processors to perform operations including: monitoring a sound level of the ambient sounds; and detecting if the sound level of the ambient sounds increases above a predetermined threshold, where the predetermined threshold is based on a decibel level. In some implementations, the logic when executed is further operable to cause the one or more processors to perform operations including: monitoring a sound level of the ambient sounds; and detecting if the sound level of the ambient sounds increases above a predetermined threshold, where the predetermined threshold is based on a percentage of the media content sounds. In some implementations, the logic when executed is further operable to cause the one or more processors to perform operations including: monitoring a sound level of the ambient sounds; detecting if the sound level of the ambient sounds increases above a predetermined threshold; and attenuating the ambient sounds such that the user hears the media content sounds and such that the user does not hear the ambient sounds. In some implementations, the logic when executed is further operable to cause the one or more processors to perform operations including: monitoring a sound level of the ambient sounds; detecting if the sound level of the ambient sounds increases above a predetermined threshold; attenuating the ambient sounds if the ambient sounds increase above the predetermined threshold; and pausing the media content sounds for a predetermined time period if the ambient sound increases above the predetermined threshold.

In some implementations, a non-transitory computer-readable storage medium with program instructions thereon is provided. When executed by one or more processors, the instructions are operable to cause the one or more processors to perform operations including: capturing, by a one or more microphones coupled to one or more earbuds, ambient sounds from an environment of the user while the user is wearing the one or more earbuds; enabling, by the one or more earbuds, the user to hear the ambient sounds and media content sounds; and attenuating the ambient sounds based on one or more noise cancellation policies.

With further regard to the computer-readable storage medium, in some implementations, the instructions when executed are further operable to cause the one or more processors to perform operations including merging the ambient sounds with the content media sounds. In some implementations, the instructions when executed are further operable to cause the one or more processors to perform operations including: monitoring a sound level of the ambient sounds; detecting if the sound level of the ambient sounds increases above a predetermined threshold; and attenuating the ambient sounds if the ambient sound increases above the predetermined threshold. In some implementations, the instructions when executed are further operable to cause the one or more processors to perform operations including: monitoring a sound level of the ambient sounds; and detecting if the sound level of the ambient sounds increases above a predetermined threshold, where the predetermined threshold is based on a decibel level. In some implementations, the instructions when executed are further operable to cause the one or more processors to perform operations including: monitoring a sound level of the ambient sounds; and detecting if the sound level of the ambient sounds increases above a predetermined threshold, where the predetermined threshold is based on a percentage of the media content sounds. In some implementations, the instructions when executed are further operable to cause the one or more processors to perform operations including: monitoring a sound level of the ambient sounds; detecting if the sound level of the ambient sounds increases above a predetermined threshold; and attenuating the ambient sounds such that the user hears the media content sounds and such that the user does not hear the ambient sounds. In some implementations, the instructions when executed are further operable to cause the one or more processors to perform operations including: monitoring a sound level of the ambient sounds; detecting if the sound level of the ambient sounds increases above a predetermined threshold; attenuating the ambient sounds if the ambient sounds increase above the predetermined threshold; and pausing the media content sounds for a predetermined time period if the ambient sound increases above the predetermined threshold.

In some implementations, a method includes: capturing, by a one or more microphones coupled to one or more earbuds, ambient sounds from an environment of the user while the user is wearing the one or more earbuds; enabling, by the one or more earbuds, the user to hear the ambient sounds and media content sounds; and attenuating the ambient sounds based on one or more noise cancellation policies.

With further regard to the method, in some implementations, the method further includes merging the ambient sounds with the content media sounds. In some implementations, the method further includes: monitoring a sound level of the ambient sounds; detecting if the sound level of the ambient sounds increases above a predetermined threshold; and attenuating the ambient sounds if the ambient sound increases above the predetermined threshold. In some implementations, the method further includes: monitoring a sound level of the ambient sounds; and detecting if the sound level of the ambient sounds increases above a predetermined threshold, where the predetermined threshold is based on a decibel level. In some implementations, the method further includes: monitoring a sound level of the ambient sounds; and detecting if the sound level of the ambient sounds increases above a predetermined threshold, where the predetermined threshold is based on a percentage of the media content sounds. In some implementations, the method further includes: monitoring a sound level of the ambient sounds; detecting if the sound level of the ambient sounds increases above a predetermined threshold; and attenuating the ambient sounds such that the user hears the media content sounds and such that the user does not hear the ambient sounds.

A further understanding of the nature and the advantages of particular implementations disclosed herein may be realized by reference of the remaining portions of the specification and the attached drawings.

DETAILED DESCRIPTION

Implementations described herein provide noise cancelation for loud ambient transient sounds. In various scenarios, a user may want to hear ambient sounds while also listening to media content on the earbuds worn by the user. For example, a user may want to be aware of their surroundings. For example, a runner outside in the street may want to know if cars, bicycles or people are approaching. In this scenario, the user may want to listen to media content sounds and also hear ambient sounds, where the user hears both but the volume of media content sounds is higher than the volume of ambient sounds. Implementations described herein address these issues.

As described in more detail herein, when a user is listening to media content using earbuds, the ambient noise from the environment may become too loud even if temporary. For example, the cars passing by someone who is on-foot may become too loud. To avoid the user needing to turn up the volume of the media content sounds, which may damage the ears of the user in the long term, the system automatically without human intervention turns on noise cancellation features. The system automatically adjusts or attenuates the volume of the ambient sounds so as to not interfere with the user's enjoyment of the media content. Presuming that the user still desires to hear ambient sounds for safety reasons, the system automatically reduces the noise cancellation features in order to enable the user to again hear the ambient sounds, or hear the ambient sounds to a louder yet comfortable level while still listing to media content.

As described in more detail herein, in various implementations, a system captures, by a one or more microphones coupled to one or more earbuds, ambient sounds from an environment of the user while the user is wearing the one or more earbuds. The system enables, by the one or more earbuds, the user to hear the ambient sounds and media content sounds. The system attenuates the ambient sounds based on one or more noise cancellation policies. Various example implementations directed to these features are described in more detail herein.

Figure 1:
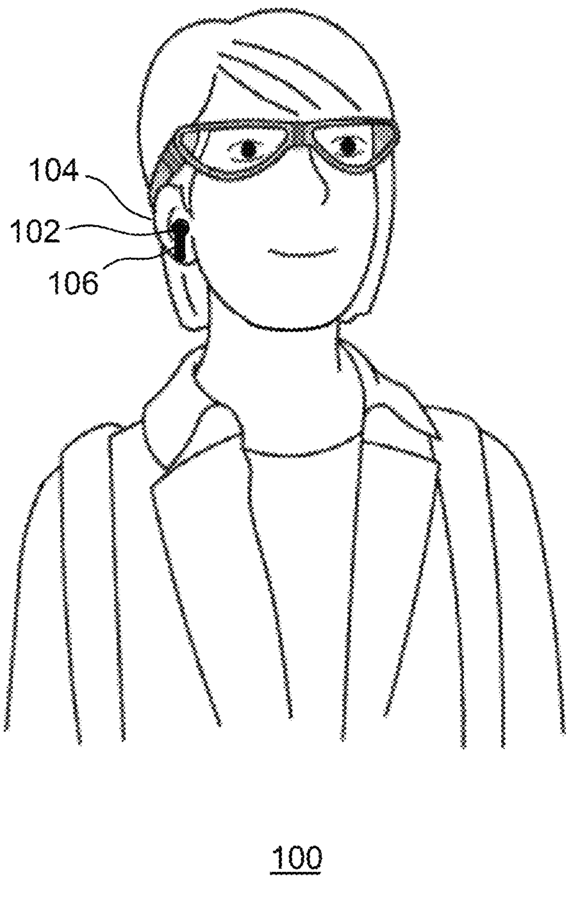
FIG. 1 is a block diagram of a user wearing an earbud in an ear, according to some implementations.

FIG. 1 is a block diagram of a user 100 wearing an earbud 102 in an ear 104, according to some implementations. As shown, earbud 102 has a post 106 coupled thereto. Post 106 may contain components such as a rechargeable battery, wiring, etc. Implementations described herein may be applied to a single earbud such as earbud 102 in the right ear of user 100. These implementations may apply to a second earbud (not shown) such as one in the left ear of the user. Further implementations directed to operations of earbud 102 and/or a second earbud are described in more detail herein, including in FIG. 2, for example.

Figure 2:
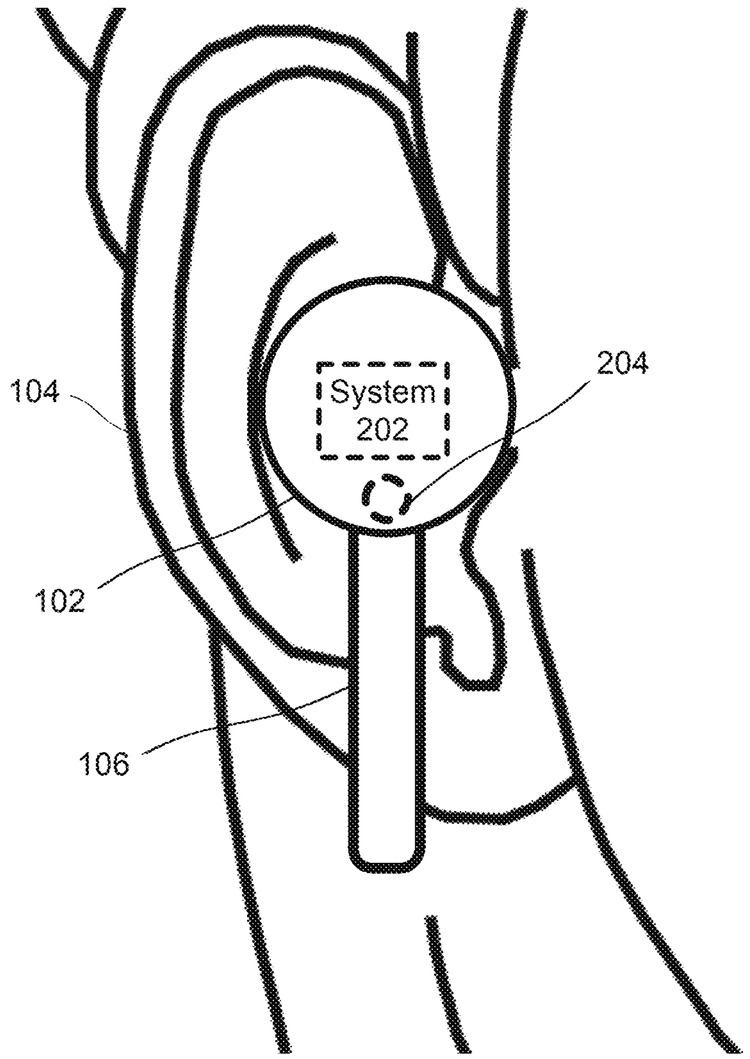
FIG. 2 is a close-up diagram of an earbud inserted in the ear of the user, where the earbud detects ambient sounds from the environment of the user, according to some implementations.

FIG. 2 is a close-up diagram of earbud 102 inserted in ear 104 of the user, where earbud 102 detects ambient sounds from the environment of the user, according to some implementations. In various implementations, earbud 102 includes a system 202 and a microphone 204. While microphone 204 is positioned as shown, the position of microphone 204 may be anywhere on earbud 102. System 202 controls operations of earbud 106 and microphone 204 to perform implementations described herein.

The various implementations described herein may apply to a single earbud and corresponding microphone, such as earbud 102 and microphone 204 and/or may apply to a second earbud and corresponding microphone (not shown). For example, a user may wear such an earbud system configured to be inserted in the right ear and/or left ear of a user. If there are multiple earbuds (e.g., two earbuds), system 202 of earbud 102 communicates with a corresponding system of the other earbud such that they synchronize in order to provide media content sounds as well as ambient sounds to the user via microphone 204 and via the microphone of the other earbud.

As described in more detail herein, system 202 captures, by the one or more microphones such as microphone 204, ambient sounds from an environment of the user while the user is wearing the one or more earbuds. System 202 also enables, by the one or more earbuds, the user to hear the ambient sounds along with media content sounds. In various implementations, system 202 attenuates the ambient sounds based on one or more noise cancellation policies. This enables the user to hear ambient sounds without interfering with media content sounds (e.g., music, podcasts, audio books, etc.). Further implementations directed to the generation and conducting of the surveys are described in more detail herein.

For ease of illustration, FIG. 2 shows one block for each of system 202 and microphone 204. These blocks 202 and 204 may represent multiple systems and microphones. For example, in some implementations, there may be two or more microphones associated with earbud 102, where each microphone detects ambient sounds coming from multiple directions (e.g., front, side, rear directions, etc.). In another example, a microphone that is remote to and associated with earbud 102 may also capture ambient sounds from the environment. Such a remote microphone may be one that is integrated with another client device such as a smartphone. In other implementations, the overall system may not have all of the components shown and/or may have other elements including other types of elements instead of, or in addition to, those shown herein.

While system 202 performs implementations described herein, in other implementations, any suitable component or combination of components associated with system 202 or any suitable processor or processors associated with system 202 may facilitate performing the implementations described herein. For example, system 202 may be integrated into one or more of the earbuds. While each earbud may include its own integrated system, two systems of the two earbuds synchronize in order to provide media content to the user. Also, either of the two systems of the two earbuds share detected ambient sounds to be processed to monitor and control the volume of such ambient sounds when delivered to the user. In various implementations, there may be a master system such as system 202 and a slave system such as the system of the other earbud, or vice versa.

While system 202 is shown as being integrated with earbud 102, in other implementations, system 202 may represent a master system that is remote to the earbud 102. For example, in some implementations, system 202 may be integrated into a smartphone (not shown) or other client device that communicates with the earbuds. In various implementations, system 202 may be in the cloud and may communicate with the earbuds via a smartphone or other client device. For ease of illustration, system 202 shown may represent any of these system implementations.

While implementations are described herein in the context to earbuds, these implementations may apply to other types of devices. For example, various implementations may also apply to hearing aids.

Figure 3:
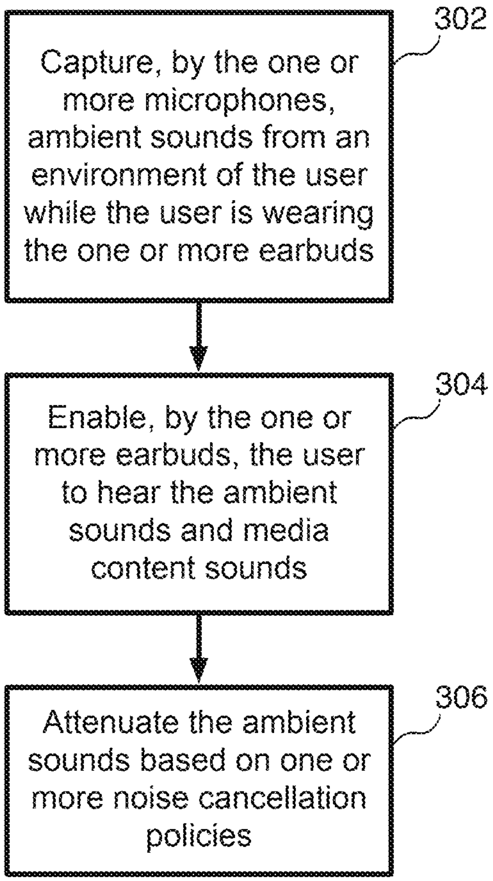
FIG. 3 is an example flow diagram for noise cancelation for loud ambient transient sound, according to some implementations.

FIG. 3 is an example flow diagram for noise cancelation for loud ambient transient sound, according to some implementations. Referring to both FIGS. 2 and 3, a method is initiated at block 3202, where a system such as system 202 captures, by a one or more microphones such as microphone 204 coupled to one or more earbuds such as earbud 102, ambient sounds from an environment of the user while the user is wearing the one or more earbuds.

At block 304, system 202 enables, by the one or more earbuds such as earbud 102, the user to hear the ambient sounds and media content sounds]. In various implementations, the system merges the ambient sounds with the content media sounds. As such, the system enables the user to listen to media content sounds while still being able to hear ambient sounds.

In various implementations, the system monitors a sound level of the ambient sounds. The system detects if the sound level of the ambient sounds increase above a predetermined threshold. The system attenuates the ambient sound if the ambient sound increases above the predetermined threshold. In some scenarios, a noise cancellation policy may be for the system to place different predetermined thresholds at different levels, depending on the circumstance. For example, the system may apply a maximum threshold, where if the sound level of the ambient sound reaches the maximum threshold, the system may cause volume of the ambient sounds to go as low as zero, blocking the ambient sounds 100%, for example. This may be an instance of a loud motorcycle or loud construction equipment, etc.

In various implementations, the system monitors a sound level of the ambient sounds. The system detects if the sound level of the ambient sounds increase above a predetermined threshold. In various implementations, the predetermined threshold is based on a decibel level.

In various implementations, the system monitors a sound level of the ambient sounds. The system detects if the sound level of the ambient sounds increases above a predetermined threshold. In some implementations, the predetermined threshold is based on a percentage of the media content sounds. In some implementations, a noise cancellation policy may for the system to control the volume of ambient sound as a percentage of the media content sound. For example, the system may allow 100% of the ambient noise to be heard by the user as long as the volume of the ambient sounds is 50% or less than the volume of the media content sounds. The system may use any appropriate measuring value such as decibels. In various implementations, the system may enable the user to set the predetermined thresholds.

In various implementations, the system monitors a sound level of the ambient sounds. The system detects if the sound level of the ambient sounds increase above a predetermined threshold. The system attenuates the ambient sounds such that the user hears the media content sounds and such that the user does not hear the ambient sounds.

In various implementations, the system monitors a sound level of the ambient sounds. The system detects if the sound level of the ambient sounds increase above a predetermined threshold. The system attenuates the ambient sounds if the ambient sound increases above the predetermined threshold. The system pauses the media content sounds for a predetermined time period if the ambient sound increases above the predetermined threshold.

Referring still to FIG. 3, at block 306, system 202 attenuates the ambient sounds based on one or more noise cancellation policies. In some implementations, the system may modify noise cancellation and need not automatically modify the volume of ambient sounds all the time. Rather, in some implementations, the system may automatically turn on noise cancellation when ambient environment sounds exceed a predetermined threshold, when the ambient sounds interfere with the media content sounds, and/or when the ambient sounds may damage hearing. This could occur when media content is not actually playing, but simply to reduce the loudness of ambient sounds when the volume gets too loud.

In various implementations, the system may enable the user to set predetermined thresholds described herein. For example, the system may provide a volume threshold control to the user via a user interface (not shown) on the earbud itself or using an application on device such as a smartphone. The volume threshold control may be, for example, slider where each position of the slider (e.g., 1-20, etc.) represents a relative value (e.g., percentage, fraction, etc.) of the volume of the ambient sounds compared to the volume of the media count sounds. As such, the volume of the media content is louder to the user than and can thus be heard over the volume of the ambient sounds. Yet, the ambient sounds can still be heard by the user, in case the ambient sound is caused by a vehicle getting too close to the user, thereby warning the user to get out of the way, for example.

In various implementations, after the volume of the loud ambient sounds drops below a predetermined threshold, the system may resume the media content sounds (e.g., resume the music, podcast, audio book, etc.). In some implementations, after the volume of the loud ambient sounds drops below a predetermined threshold, the system may resume the media content sounds be go back in the recording by a predetermined amount of time (e.g., jump back 5 seconds, 10 seconds, 15 seconds in the music, podcast, audio book, etc.).

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Implementations described herein provide various benefits. For example, implementations enable a user to hear ambient sounds such as automobile traffic while also hearing media content sounds. Implementations described herein also enable a user continue to hear media content sounds even while loud ambient transient sounds occur.

Figure 4:
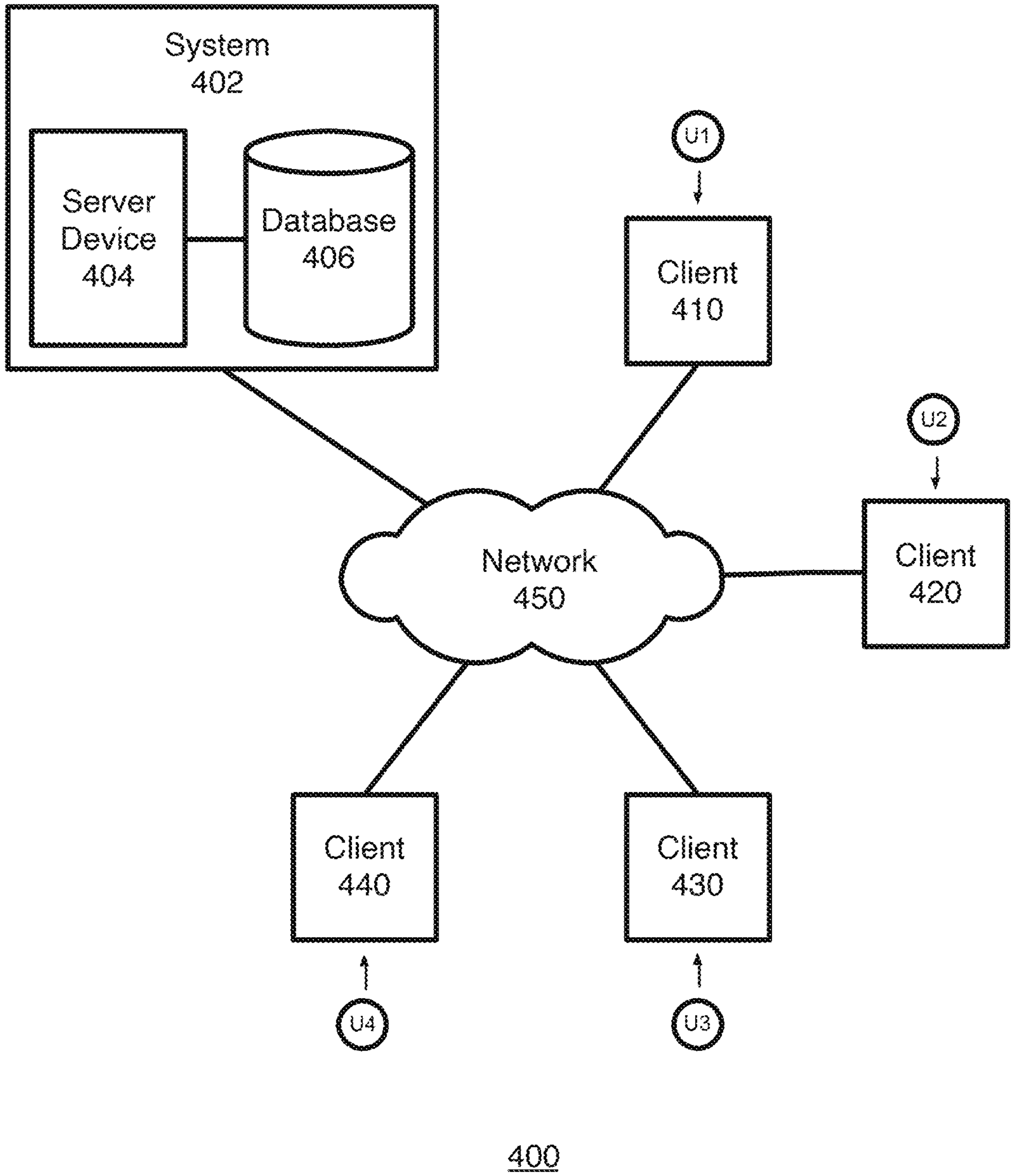
FIG. 4 is a block diagram of an example network environment, which may be used for some implementations described herein.

FIG. 4 is a block diagram of an example network environment 400, which may be used for some implementations described herein. In some implementations, network environment 400 includes a system 402, which includes a server device 404 and a database 406. For example, system 402 may be used to implement system 202 of FIG. 2, as well as to perform implementations described herein. Network environment 400 also includes client devices 410, 420, 430, and 440, which may communicate with system 402 and/or may communicate with each other directly or via system 402.

Any of client devices 410, 420, 430, and 440 may represent earbuds and mobile devices such as smartphones that have systems and/or microphones that may assist system 202 of FIG. 2 and/or system 402 of FIG. 4. Network environment 400 also includes a network 450 through which system 402 and client devices 410, 420, 430, and 440 communicate. Network 450 may be any suitable communication network such as a Wi-Fi network, Bluetooth network, the Internet, etc.

For ease of illustration, FIG. 4 shows one block for each of system 402, server device 404, and network database 406, and shows four blocks for client devices 410, 420, 430, and 440. Blocks 402, 404, and 406 may represent multiple systems, server devices, and network databases. Also, there may be any number of client devices. In other implementations, environment 400 may not have all of the components shown and/or may have other elements including other types of elements instead of, or in addition to, those shown herein.

While server device 404 of system 402 performs implementations described herein, in other implementations, any suitable component or combination of components associated with system 402 or any suitable processor or processors associated with system 402 may facilitate performing the implementations described herein.

In the various implementations described herein, a processor of system 402 and/or a processor of any client device 410, 420, 430, and 440 cause the elements described herein (e.g., information, etc.) to be displayed in a user interface on one or more display screens.

Figure 5:
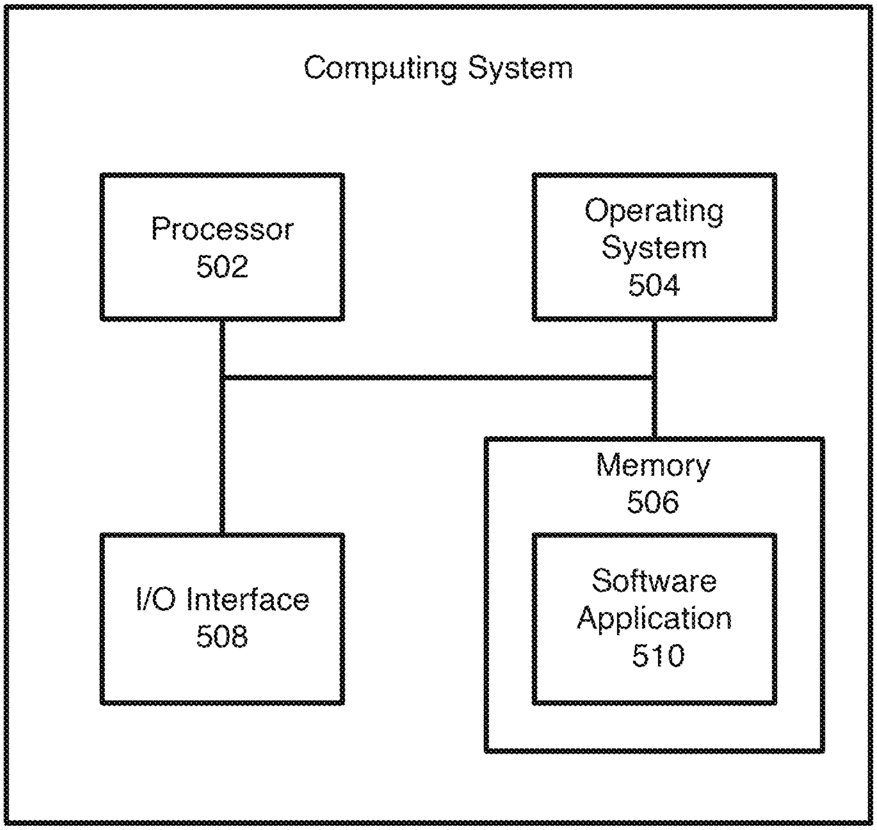
FIG. 5 is a block diagram of an example computer system, which may be used for some implementations described herein.

FIG. 5 is a block diagram of an example computer system 500, which may be used for some implementations described herein. For example, computer system 500 may be used to implement server device 404 of FIG. 4 and/or system 102 of FIG. 1, as well as to perform implementations described herein. In some implementations, computer system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of computer system 500 or any suitable processor or processors associated with computer system 500 or any suitable system may perform the steps described. Implementations described herein may be carried out on a user device, on a server, or a combination of both.

Computer system 500 also includes a software application 510, which may be stored on memory 506 or on any other suitable storage location or computer-readable medium. Software application 510 provides instructions that enable processor 502 to perform the implementations described herein and other functions. Software application may also include an engine such as a network engine for performing various functions associated with one or more networks and network communications. The components of computer system 500 may be implemented by one or more processors or any combination of hardware devices, as well as any combination of hardware, software, firmware, etc.

For ease of illustration, FIG. 5 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computer system 500 may not have all of the components shown and/or may have other elements including other types of components instead of, or in addition to, those shown herein.

Although the description has been described with respect to particular implementations thereof, these particular implementations are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular implementations including C, C++, C#, Java, JavaScript, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a non-transitory computer-readable storage medium (also referred to as a machine-readable storage medium) for use by or in connection with the instruction execution system, apparatus, or device. Particular implementations can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A system comprising:

one or more earbuds configured to be inserted into ears of a user;

one or more microphones coupled to the one or more earbuds;

one or more processors coupled to the one or more earbuds; and logic encoded in one or more non-transitory computer-readable storage media for execution by the one or more processors and when executed operable to cause the one or more processors to perform operations comprising:

monitoring a sound level of ambient sounds;

capturing, by the one or more microphones, the ambient sounds from an environment of the user while the user is wearing the one or more earbuds;

enabling, by the one or more earbuds, the user to hear the ambient sounds and media content sounds;

detecting if the sound level of the ambient sounds increases above a predetermined threshold;

attenuating the ambient sounds based on one or more noise cancellation policies;

attenuating the ambient sounds if the ambient sounds increase above the predetermined threshold; and pausing the media content sounds for a predetermined time period if the ambient sound increases above the predetermined threshold.

2. The system of claim 1, wherein the logic when executed is further operable to cause the one or more processors to perform operations comprising merging the ambient sounds with the content media sounds.

3. The system of claim 1, wherein the predetermined threshold is based on a decibel level.

4. The system of claim 1, wherein the predetermined threshold is based on a percentage of the media content sounds.

5. The system of claim 1, wherein the logic when executed is further operable to cause the one or more processors to perform operations comprising attenuating the ambient sounds such that the user hears the media content sounds and such that the user does not hear the ambient sounds.

6. A non-transitory computer-readable storage medium with program instructions stored thereon, the program instructions when executed by one or more processors are operable to cause the one or more processors to perform operations comprising:

monitoring a sound level of ambient sounds;

capturing, by the one or more microphones, the ambient sounds from an environment of the user while the user is wearing the one or more earbuds;

enabling, by the one or more earbuds, the user to hear the ambient sounds and media content sounds;

detecting if the sound level of the ambient sounds increases above a predetermined threshold;

attenuating the ambient sounds based on one or more noise cancellation policies;

attenuating the ambient sounds if the ambient sounds increase above the predetermined threshold; and pausing the media content sounds for a predetermined time period if the ambient sound increases above the predetermined threshold.

7. The computer-readable storage medium of claim 6, wherein the instructions when executed are further operable to cause the one or more processors to perform operations comprising merging the ambient sounds with the content media sounds.

8. The computer-readable storage medium of claim 6, wherein the predetermined threshold is based on a decibel level.

9. The computer-readable storage medium of claim 6, wherein the predetermined threshold is based on a percentage of the media content sounds.

10. The computer-readable storage medium of claim 6, wherein the instructions when executed are further operable to cause the one or more processors to perform operations comprising attenuating the ambient sounds such that the user hears the media content sounds and such that the user does not hear the ambient sounds.

11. A computer-implemented method comprising:

monitoring a sound level of ambient sounds;

capturing, by the one or more microphones, the ambient sounds from an environment of the user while the user is wearing the one or more earbuds;

enabling, by the one or more earbuds, the user to hear the ambient sounds and media content sounds;

detecting if the sound level of the ambient sounds increases above a predetermined threshold;

attenuating the ambient sounds based on one or more noise cancellation policies;

attenuating the ambient sounds if the ambient sounds increase above the predetermined threshold; and pausing the media content sounds for a predetermined time period if the ambient sound increases above the predetermined threshold.

12. The method of claim 11, further comprising merging the ambient sounds with the content media sounds.

13. The method of claim 11, wherein the predetermined threshold is based on a decibel level.

14. The method of claim 11, wherein the predetermined threshold is based on a percentage of the media content sounds.

15. The method of claim 11, further comprising attenuating the ambient sounds such that the user hears the media content sounds and such that the user does not hear the ambient sounds.

* * * * *